UNITED STATES PATENT OFFICE.

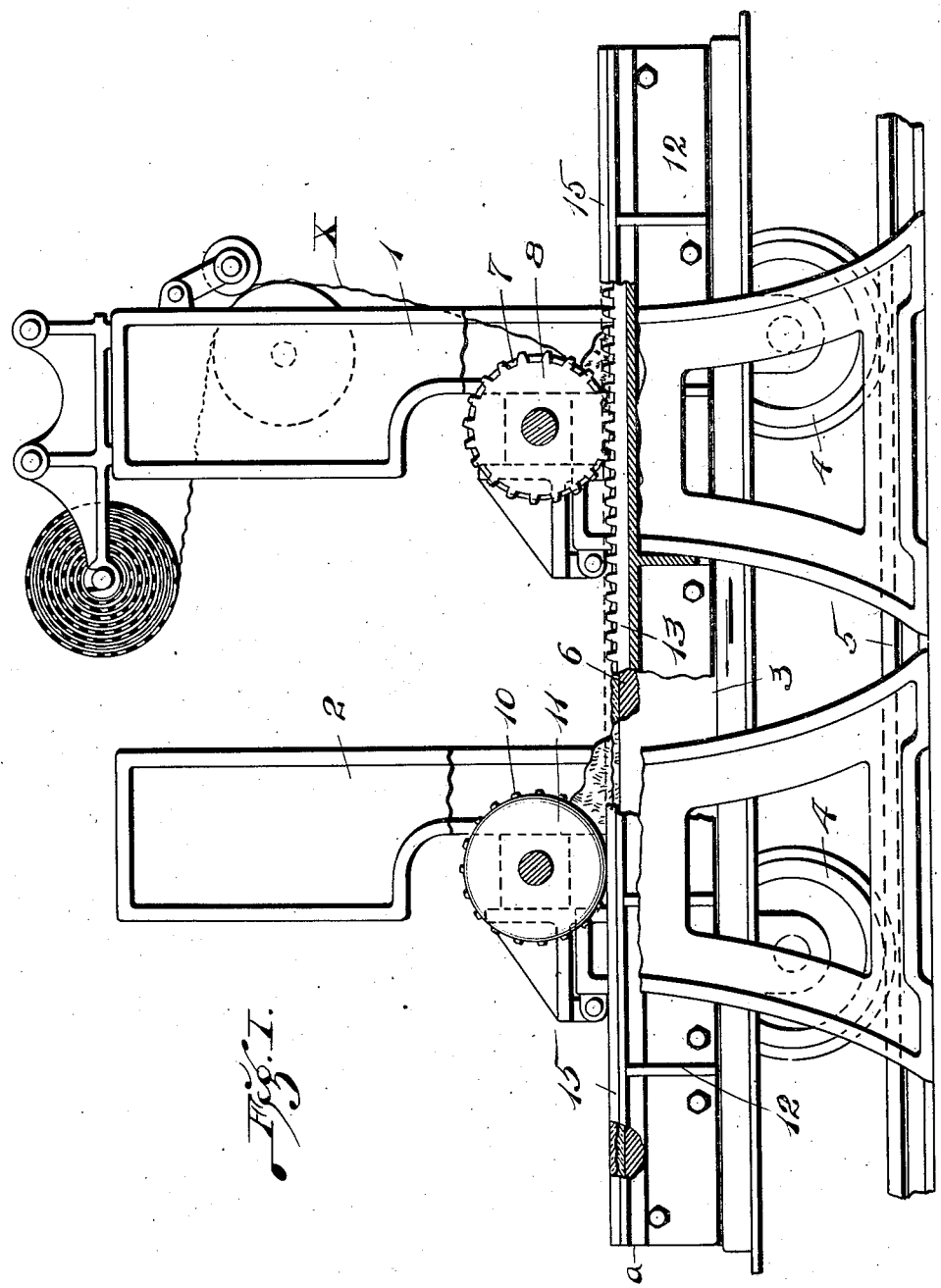

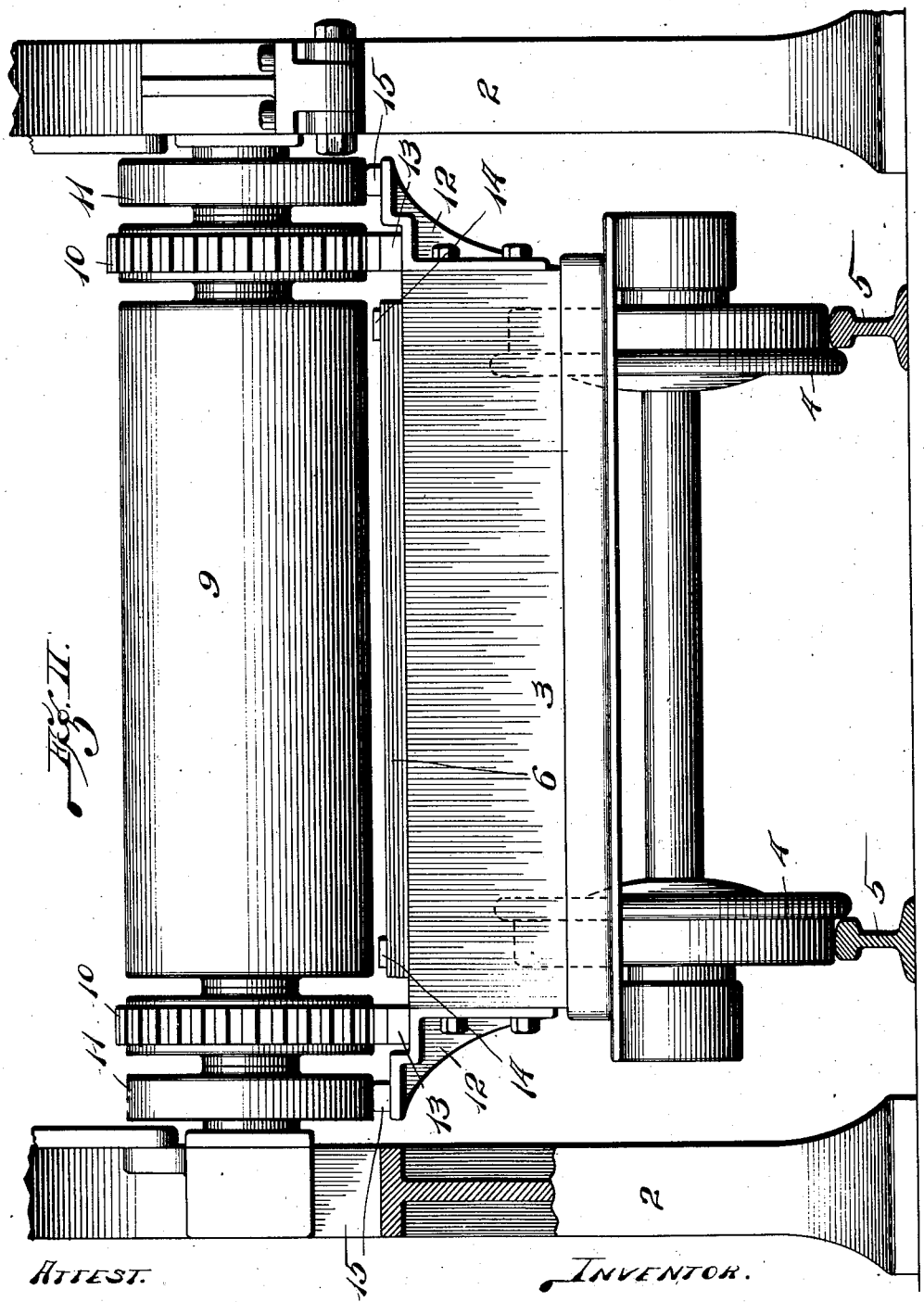

ANTON MEYER, OF ST. LOUIS, MISSOURI, ASSIGNOR TO MISSOURI WIRE AND ROLLED GLASS MANUFACTURING COMPANY, OF ST. LOUIS, MISSOURI, A CORPORATION.

APPARATUS FOR ROLLING GLASS.

968,178.     Specification of Letters Patent.     Patented Aug. 23, 1910.

Application filed May 3, 1909. Serial No. 493,479.

*To all whom it may concern:*

Be it known that I, ANTON MEYER, a citizen of the United States of America, residing in the city of St. Louis, in the State of Missouri, have invented certain new and useful Improvements in Apparatus for Rolling Glass, of which the following is a full, clear, and exact description, reference being had to the accompanying drawings, forming part of this specification.

My invention relates to an apparatus for rolling what is commonly known as "wire glass;" or, in other words, plates of glass having embedded therein sheets of wire fabric.

In rolling plates of glass of this description, it is necessary to first roll one layer of glass, apply the sheet of wire fabric above the layer of glass that has been rolled, and finally roll a second layer of glass onto the first layer above the sheet of wire fabric. In producing wire glass by following the procedure referred to, it is the usual practice to utilize a carriage having a table on which the glass is rolled, a leading roll operating above the table by which the first layer of glass is rolled, and which is coöperable with the carriage, and a following roll coöperable with the carriage located at a greater elevation than the leading roll, and which performs the office of rolling the second layer of glass. It has been the practice heretofore to support the leading and following rolls upon runway members common to both, carried by the table carriage, and to operate these rolls by means in part common to both of them carried by the table carriage; and further in order that the leading roll may operate more closely to the glass supporting table than the following roll to recess the end portions of the leading roll that operate upon the runway members. The recessing of the ends of the leading roll, for the purpose stated, has been found to be an objectionable feature in wire glass rolling apparatuses for the reason that it occasions a difference in the peripheral speed of travel between the central glass working body of the leading roll and the recessed supporting ends of the leading roll due to the difference in circumference between the glass working body and the supporting ends of the roll, as a result of which a dragging action of the working body of the leading roll upon the first layer of glass and consequent faulty production of said layer, such as would not be produced in the absence of said dragging action.

The prime object of my invention is to produce a glass rolling apparatus in which the leading roll and the following roll are supported independent of each other through the medium of the table carriage of the apparatus, and to provide for both the leading and following rolls partaking of the same peripheral speed at their glass working bodies as at the supporting portions, whereby dragging action of either roll upon the glass being worked is eliminated.

Figure I is in part a side elevation and in part a vertical longitudinal section of my glass rolling apparatus, portions of the frame of the apparatus being broken out to afford a view of parts back of them. Fig. II is an enlarged end elevation of the apparatus, viewed at its end at which the following roll is supported.

In the accompanying drawings:—1 and 2 designate standards arranged in pairs at the sides of my apparatus.

3 designates a carriage having track wheels 4 that are adapted to ride upon rails 5 in order that the carriage may be moved longitudinally in the apparatus. The carriage is provided with a table 6.

7 designates a leading roll that is rotatable above the carriage table 6 and which is provided with spindles that are mounted in boxes arranged for vertical movement in the standards 1. The spindles of this roll have fixed thereto spur wheels 8, one of which is shown in Fig. I, and which are coöperable with operating members carried by the carriage 3, as will hereinafter appear.

9 designates a following roll, the spindles of which are seated in bearing boxes that are loosely arranged for vertical movement in the standards 2 and have fixed thereto but spaced from the ends of the following roll spur wheels 10 arranged to coöperate with the same roll operating carriage carried members that operate the spur wheels 8 of the leading roll 7. The spindles of the following roll also have fixed to them outside of the spur wheels 10 and spaced from the latter rollers 11 that are of the same diameter as the diameter of the working body of the roll and which, by operating upon runway members carried by the carriage 3, and to be hereinafter more particularly mentioned, serve to support the following roll in a manner to provide for the body of said roll moving with the same peripheral speed as that partaken of by the rollers in the operation of the apparatus.

12 designates stepped rails fixed to the carriage 3 at its sides and which project laterally from said carriage to points beneath the rollers 11 associated with the following roll 9.

13 designates rack bars fixed to the carriage 3 and preferably arranged upon the lower steps of the stepped rails 12. These rack bars extend longitudinally of the carriage 3 and are so positioned as to be engaged by the spur wheels 8 and 10 associated with the leading and following rolls 7 and 9, in order that when the carriage is moved on the track rails 5, rotation will be imparted to both of the rolls through the instrumentality of said parts.

The table 6 on the carriage 3 has mounted thereon trangs 14 that extend longitudinally of the carriage and serve as supports for the leading roll in order that it may be maintained at the proper elevation above the surface of the table to roll or spread an initial layer of glass. The leading roll is of the same diameter throughout its length, and consequently when said roll partakes of travel while supported by the trangs 14, its middle portion that operates upon the glass placed upon said table between said trangs moves with a peripheral speed the same as the peripheral speed partaken of by the end portions of the roll that ride upon the trangs.

15 designates trangs arranged upon the upper steps of the stepped rails 12 and which serve as runway members for the rollers 11 associated with the following roll 9. These trangs 15 are of sufficient height to uphold the following roll at an elevation sufficiently above the elevation at which the leading roll is supported to provide for the following roll operating independently of and above the leading roll to spread the second layer of glass, after the first layer of glass has been spread by the leading roll.

In the practical use of my apparatus, the carriage 3 is first moved to a position that will cause its end indicated by $a$, (Fig. I), or the portion of the table on the carriage on which the first batch of molten glass is to be laid to be present in front of the leading roll 7 when placed upon the table. The batch of molten glass from which the first layer is to be produced is then deposited on the carriage table and said table is moved in the direction of the arrow, Fig. I, during which movement the leading roll acts to roll or spread the glass and produce the first layer of the plate of wire glass. Simultaneously with this action, the wire fabric indicated by the letter X is fed beneath the leading roll and becomes impressed into the first layer of glass. A second batch of molten glass is then placed upon the first layer and the wire fabric, in front of the following roll, and this second batch is, during the movement of the carriage, rolled or spread by the following roll to complete the plate of wire glass. During these operations, the leading and following rolls operate independently of each other, and due to the described constructions of the parts providing for the support of the rolls independently of each other, and the arrangement whereby the glass working bodies of the rolls move with the same peripheral speeds as the roller supporting portions of the rolls, there is uniformity of action by the rolls upon the glass and absence of any dragging of the rolls, as a consequence of which the liability of the occurrence of flaws in the rolled glass, due to uneven rolling effect, is eliminated.

I claim:—

1. An apparatus for rolling glass comprising a carriage provided with a receiving table, trangs located on the receiving table, rails fixed to the sides of the carriage, rack-bars located on the rails, a pair of standards, boxes mounted in and having vertical movement in the standards, a leading roll, supported on the trangs and having spindles mounted in the boxes and spur wheels fixed to the spindles and meshed by the rack-bars.

2. An apparatus for rolling glass comprising a carriage provided with a receiving table, stepped rails fixed to the sides of the carriage, rack-bars located on the lower steps of the stepped rails, trangs located on the upper steps of the stepped rails, a pair of standards, boxes mounted in and having vertical movement in the standards, a following roll having spindles mounted in the boxes, rollers on the spindles whereby the following roll is supported on the trangs and spur wheels fixed to the spindles between the following roll and its rollers and meshed by the rack-bars.

3. An apparatus for rolling glass comprising a carriage provided with a receiving table, stepped rails fixed to the sides of the carriage, rack-bars located on the lower steps of the stepped rails, front and rear paired standards, boxes mounted in and having vertical movement in the paired standards, a leading roll supported on the trangs on the receiving table, and having spindles mounted in the boxes of the front standards, spur wheels fixed to the spindles of the leading roll and meshed by the rack-bars, trangs located on the upper steps of the stepped rails, a following roll having spindles mounted in the boxes of the rear standards, rollers on the spindles of the following roll whereby the following roll is supported on the trangs on the stepped rails, and spur wheels fixed to the spindles of the following roll between the following roll and its rollers and meshed by the rack-bars.

ANTON MEYER.

In the presence of—
H. G. Cook,
E. B. Linn.